United States Patent [19]
Keller

[11] Patent Number: 5,246,759
[45] Date of Patent: Sep. 21, 1993

[54] HEAT INSULATING SYSTEM

[75] Inventor: Karl Keller, Staatsangehörigkeit, Fed. Rep. of Germany

[73] Assignee: Messerschmitt-Bolkow-Blohm GmbH, Munich, Fed. Rep. of Germany

[21] Appl. No.: 702,269

[22] Filed: May 17, 1991

[30] Foreign Application Priority Data

May 25, 1990 [DE] Fed. Rep. of Germany ....... 4016407

[51] Int. Cl.$^5$ .................... B32B 15/00; B32B 5/26
[52] U.S. Cl. ......................... 428/74; 428/69; 428/76; 428/138; 428/198; 428/282; 428/285; 220/423; 220/452
[58] Field of Search ............ 428/74, 69, 76, 285, 428/138, 198, 282; 220/901, 422, 423, 452

[56] References Cited

U.S. PATENT DOCUMENTS 3,007,596 11/1961 Matsch ............................... 220/423
4,777,086 10/1988 Madden et al. ..................... 428/285

Primary Examiner—Alexander S. Thomas
Attorney, Agent, or Firm—McGlew and Tuttle

[57] ABSTRACT

A thermal insulation system 1, especially for low-temperature containers, formed of at least two multilayer mats 4 and 5, which are made from fiber mats 8 and are separated by a gas-tight film 6. The inner multilayer mat 4 arranged directly on the container wall 2 is filled with a gas, which cannot condense during operation and whose pressure can be adjusted to the actual ambient pressure. The outer multilayer mat 5 is filled with the ambient gas, generally air or nitrogen, and the pressure is adjusted to the ambient pressure. The multilayer mats 4 and 5 may be further subdivided by reflecting films 7 that are permeable to gas.

14 Claims, 1 Drawing Sheet

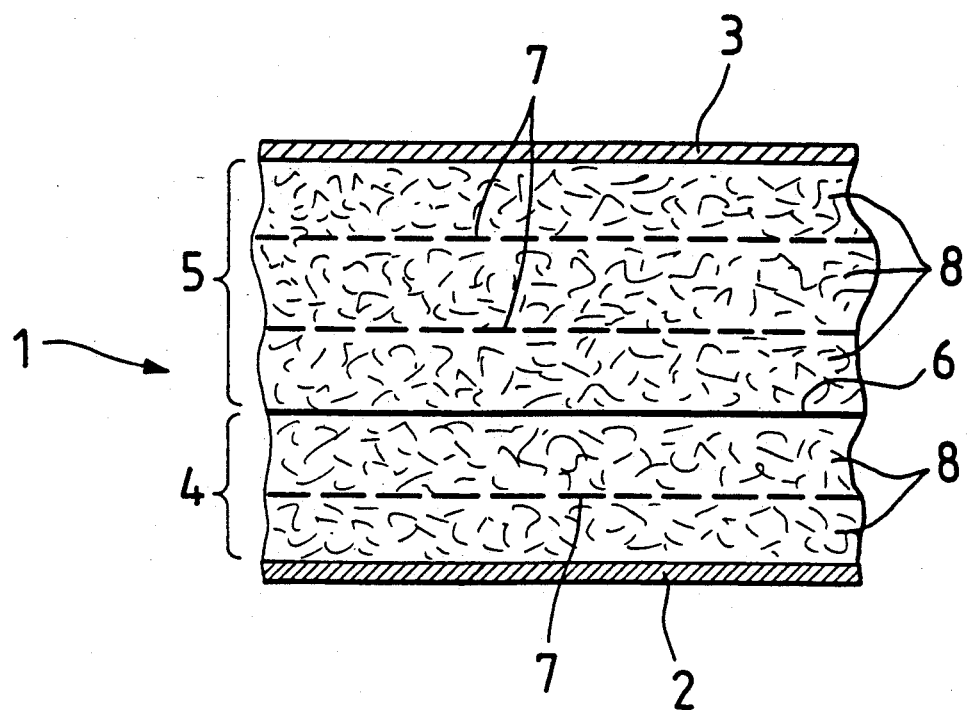

HEAT INSULATING SYSTEM

FIELD OF THE INVENTION

The present invention pertains to a reusable thermal insulation system made from insulating materials that are separated from one another by reflecting films, particularly for use with containers filled with liquid hydrogen for use in space transportation flight.

BACKGROUND OF THE INVENTION

In prior-art thermal insulation systems, e.g., reusable low-temperature containers of light-weight design, which are suitable for long-term reusability for space flight purposes, a number of problems occur, which cannot be solved at present. These include, e.g., Quantitative determination of degradation over time,
dynamic alternating load at the transition between the insulation and the container wall,
prevention of the diffusion of oxygen through the insulation and condensation of the oxygen on the container wall or enrichment of a hydrogen-oxygen mixture in the insulation,
minimizing the weight of the insulation by improving the thermal efficiency.

SUMMARY AND OBJECTS OF THE INVENTION

It is an object of the present invention to provide a reusable thermal insulation system of the class described in the introduction, which eliminates, due to its design, all the disadvantages arising from the above-described problems.

According to the invention, a thermal insulation system is provided formed of insulating materials that are separated from one another by reflecting films. The system includes at least two porous (multilayer) mats positioned separated from one another by a gas-tight film. The porous (multilayer) mats are filled with different gases which cannot be condensed during operation and whose pressure can be adapted to the actual operating pressure. The (multilayer) mats include one or several insulating layers separated from one another by perforated reflecting films.

The insulating layers are preferably formed of fiber mats. An inner (multilayer) mat is arranged directly on the container wall and is filled e.g. with helium gas and an outer (multilayer) mat is filled with air or nitrogen. The reflecting films are preferably metallized films of Polyethylene Terephthalates and Thermoset Polyimide for low temperature ranges and metallized ceramic films for higher temperature ranges.

Polyethylene Terephthalates are known under the trademark MYLAR and Thermoset Polyimide is known under the trademark KAPTON. The gas-tight film preferably comprises (multilayered) aluminized KAPTON film for low temperature ranges. The insulating layers are preferably bonded to the reflecting films and the multilayer mats are preferably bonded to the gas-tight film in points.

The insulating layers are preferably formed of glass fibers. These layers consist of fibers with a minimum fiber diameter and/or layers having small density. The fiber mats may also comprise metal fibers, synthetic fibers, ceramic fibers or coated fibers. The gas-tight film alternatively might comprise a metal foil or other tight foils. The inner multilayer mat is bonded to the container wall by bonding and points are over extensive surfaces. The arrangement may be used for low temperature containers including containers for storing cryogenic fluids such as liquid hydrogen. The arrangement is especially useful for storing hydrogen in reusable space transportation systems.

The essential advantages of the present invention are:
minimal mechanical problems between the container wall and the insulation,
high thermal efficiency due to the layered structure, and
simple design and consequently high long-term stability and low safety risk due to regular purging of the inert gas.

Filling the inner multilayer mat with helium offers the advantage that it is the only gas that does not condense on the container wall if the container is filled with liquid hydrogen. Since helium has a higher thermal conductivity than air, the thermal insulation system is subdivided into at least two multilayer mats, which are separated by a gas-tight film, and the temperature of this film must be above the condensation temperature of oxygen during operation. Heat conduction by radiation and convection is greatly reduced by the reflecting films introduced into the multilayer mats between the insulating layers. If fiber mats with very thin fibers are used, the Smoluchowski effect can be utilized at reduced ambient pressures. Glass fibers are advantageous for the insulating layers because of their low specific gravity, the available fiber diameters, their noncombustibility, as well as the quality of the fibers. The aluminized Kapton or Mylar films which are to be used with preference for the low temperature range are commercially available. The gold-coated ceramic films for the higher temperature range can be produced without major expense. Connecting the insulating layers to the films by point bonding increases the shear strength of the thermal insulation system. The insulation system thus produced is preferably bonded to the container wall, but, if needed, also to the external structure. The flexibility of the insulating layers and films guarantees good adaptation to changes that occur in shape and volume.

BRIEF DESCRIPTION OF THE DRAWINGS

The FIGURE shows a cross-sectional view of the insulation according to the invention.

DETAILED DESCRIPTION OF THE PREFERRED EMBODIMENT

The single figure shows as an embodiment of the present invention the structure of a thermal insulation system 1, which is used for a container filled with liquid hydrogen. The thermal insulation system 1, which is inserted between a container wall 2 and a structural wall 3, which represents, e.g., the outer wall of a space flight object, consists of an inner multilayer mat 4 and an outer multilayer mat 5, which are separated by a gas-tight film 6. The inner multilayer mat 4 consists, e.g., of two fiber mats 8 separated by a perforated reflecting film 7, and is filled with helium gas, whose pressure can be adjusted to the actual ambient pressure by means of devices that are not shown here. The outer multilayer mat 5 consists, e.g., of three fiber mats 8 separated by the perforated reflecting films 7, and is filled with air or nitrogen. The perforated reflecting films 7 are aluminized Kapton or Mylar films. The gas-tight film 6 is made, e.g., from multilayer aluminized Kapton films. The fiber mats 8 are made, e.g., from glass fibers. The fiber mats 8 are connected to the reflecting films 7 and the multilayer mats 4 and 5 are connected to the container wall 2, to the gas-tight film 6, and to the structural wall 3 e.g., by point or extended-area bonding.

Using, e.g., gold-coated ceramic films or metal foils for the reflecting films 7 when needed is within the scope of the present invention. If needed, it is also possible to use, e.g., metal foils or other gas-tight films for the gas-tight film 6. The fiber mats 8 may also be produced by using other fibers, e.g., metal fibers, synthetic fibers, ceramic fibers, or coated fibers however glass fibers are preferred as noted above. The structure of the multilayer mats 4 and 5 may also be varied by using a different number of the fiber mats 8 and the reflecting films 7. It is also possible to use a plurality of multilayer mats 5, which in turn are separated by gas-tight films 6. To improve the shear characteristics of the thermal insulation system, other methods, e.g., connection by strip seams, instead of the point bonding may be used.

Due to modifications of the materials, filling gases, number of films, etc., which are obvious to the person skilled in the art after reviewing the principles of the invention, this principle of insulation can also be extrapolated to other applications, e.g., liquid cryogenic fluid gas-filled containers. Using layers with insulating spacers, e.g., corrugated structures, or even foam materials, instead of fiber mats, for the insulating layers is also within the scope of the present invention.

While a specific embodiment of the invention has been shown and described in detail to illustrate the application of the principles of the invention, it will be understood that the invention may be embodied otherwise without departing from such principles.

What is claimed is:

1. A thermal insulation system made from insulating materials that are separated from one another by reflecting films, comprising at least two porous multilayer mats, said porous multilayer mats being separated from one another by a gas-tight film and being filled with different gases, which cannot be condensed during operation and whose pressure can be adapted to an actual operating pressure, said multilayer mats being formed of at least two insulating layers separated from one another by perforated reflecting films.

2. A thermal insulation system according to claim 1, wherein the insulating layers are formed of fiber mats.

3. A thermal insulation system according to claim 2, wherein each of said fiber mats is formed of one of metal fibers, synthetic fibers, ceramic fibers and coated fibers.

4. A thermal insulation system according to claim 1, wherein said at least two porous multilayer mats include an inner multilayer mat arranged directly on a container wall, said inner multilayer mat being filled with helium gas, and an outer multilayer mat positioned on a side of said inner multilayer mat opposite to said container wall, said outer multilayer mat being filled with air or nitrogen.

5. A thermal insulation system according to claim 1, wherein said perforated reflecting films are formed of one of metallized KAPTON and MYLAR films for low temperature ranges and metallized ceramic films for high temperature ranges.

6. A thermal insulation system according to claim 5, wherein said gas-tight film is formed of a metal foil.

7. A thermal insulation system according to claim 1, wherein said gas-tight film is formed of multilayered aluminized KAPTON film for lower temperature ranges.

8. A thermal insulation system according to claim 1, wherein said insulating layers are bonded to said reflecting films and said multilayer mats are bonded to said gas-tight film in points.

9. A thermal insulation system according to claim 1, wherein said insulating layers consist of glass fibers.

10. A thermal insulation system according to claim 1, wherein said insulating layers are formed of fibers with a minimum fiber diameter and/or the insulating layers have a small density.

11. A thermal insulation system according to claim 1, wherein said inner multilayer mat is bonded to a container wall by bonding in point or over extensive surfaces.

12. A thermal insulation system according to claim 1, wherein said system is arranged for insulation of low-temperature containers.

13. A thermal insulation system, comprising: at least two porous multilayer mats, each of said multilayer mats being formed of at least two insulating layers; perforated reflecting films positioned between said insulating layers for separating said insulating layers; a gas-tight reflecting film positioned between said multilayer mats; a first of said porous multilayer mats being filled with a first gas and a second of said porous multilayer mats being filled with a second gas, at least one of said gases being selected such that it cannot condense during operation and such that its pressure can be adjusted to an actual ambient pressure.

14. A thermal insulation system according to claim 13, wherein:
said reflecting films are formed from one of metalized films of Polyethylene Terephthalates and Thermoset Polyimide.

* * * * *